US012533541B2

(12) United States Patent
Leichliter et al.

(10) Patent No.: US 12,533,541 B2
(45) Date of Patent: Jan. 27, 2026

(54) HAND TOOL FOR STRAIGHTENING A FLUID LINE

(71) Applicant: RB Distribution Inc., Colmar, PA (US)

(72) Inventors: Chad Timothy Leichliter, Quakertown, PA (US); Steven William Butcher, Collegeville, PA (US); Katherine Adelia Goodman, Feasterville, PA (US)

(73) Assignee: RB Distribution, Inc., Colmar, PA (US)

( * ) Notice: Subject to any disclaimer, the term of this patent is extended or adjusted under 35 U.S.C. 154(b) by 436 days.

(21) Appl. No.: 18/166,200

(22) Filed: Feb. 8, 2023

(65) Prior Publication Data

US 2024/0261613 A1 Aug. 8, 2024

(51) Int. Cl.
*A62C 33/00* (2006.01)

(52) U.S. Cl.
CPC .................................... *A62C 33/00* (2013.01)

(58) Field of Classification Search
CPC ...................................................... A62C 33/00
USPC .......................................................... 138/106
See application file for complete search history.

(56) References Cited

U.S. PATENT DOCUMENTS 2,740,309 A * 4/1956 Martin, Sr. .............. B21D 3/05 72/458
3,100,519 A * 8/1963 Johnston .................. B21F 1/02 72/78
3,706,215 A * 12/1972 Horton ..................... B21D 3/04 72/99
4,406,141 A * 9/1983 Numano .................. B21D 3/04 72/98
4,763,504 A * 8/1988 Nilsson .................... B21D 3/04 72/98
6,419,424 B1 * 7/2002 Null ....................... B65H 49/24 405/177
7,585,260 B2 9/2009 Ma
D722,857 S 2/2015 Huang et al.
D740,098 S 10/2015 Kuo et al.
9,751,121 B2 9/2017 Murphy
D807,147 S 1/2018 Renault
9,862,015 B1 * 1/2018 Lin .......................... B21D 3/02
D868,450 S 12/2019 Oxford
10,894,280 B2 * 1/2021 Huang ..................... B21D 3/02
D946,987 S 3/2022 Huang
11,826,811 B1 * 11/2023 Luo .......................... B21D 3/04
2004/0016082 A1 1/2004 Yi
2012/0304724 A1 * 12/2012 Kuroiwa .................. B21D 3/04 72/99

(Continued)

OTHER PUBLICATIONS

Two (2) photographs of a known tool at least as early as Jan. 2023.

(Continued)

*Primary Examiner* — David R Deal
(74) *Attorney, Agent, or Firm* — Volpe Koenig

(57) ABSTRACT

A hand tool for straightening a fluid line has two sections that are configured to interlock and define an elongated line straightening channel between ends of the tool. One tool section has recesses and the other tool section has projections. The hand tool is assembled by moving the two sections together and interlocking the projections and recesses to form a tubular configuration or tunnel that straightens the line.

15 Claims, 8 Drawing Sheets

(56) References Cited

U.S. PATENT DOCUMENTS

| | | | | |
|---|---|---|---|---|
| 2014/0150512 | A1 * | 6/2014 | Murphy | B21D 3/05 72/162 |
| 2020/0070228 | A1 * | 3/2020 | Tsai | B21F 1/02 |

OTHER PUBLICATIONS

Website: https://www.youtube.com/watch?v=yt9sSoFSvCk "Sealey VS5056 Brake Pipe Straightening Tool" obtained Jan. 2023.

Website: https://www.youtube.com/watch?v=9MY_AQzX03o "Coiled Tube Straightener—Brake Pipe Straightening Tool (5mm OD)" obtained Jan. 2023.

* cited by examiner

HAND TOOL FOR STRAIGHTENING A FLUID LINE

BACKGROUND

In many applications that require the transportation of a fluid, such as hydraulic fluid or air, it is desirable to eliminate kinks or sharp bend in the line. The lines for these applications are often coiled so they can be shipped in small and more regularly shaped packages. In some instances, the line may come with a preassembled connector on one or both ends of the line. While it is possible to hand straighten the line, this often results in an irregular pattern along the length and can sometimes result in undesirable manipulation of the line.

While some line straightening hand tools are available, such tools tend to be complex and inconvenient to use, especially when there is a preexisting connector on the line.

SUMMARY

A hand tool for straightening a fluid line may have two sections that are configured to interlock and define an elongated line straightening tunnel between the ends of the tool. One tool section has recesses and the other tool section has projections that are dimensioned to interlock for straightening a line. The hand tool is assembled by moving the two sections together and interlocking the projections and recesses to form the tunnel. One end of the hand tool has an enlarged flange that acts as a hand abutment as a line if pulled through the tunnel for straightening the line.

DETAILED DESCRIPTION

Embodiments of the hand tool will be described in detail with reference to the drawings wherein like or similar elements are identified by the same indicator.

Figure 1:
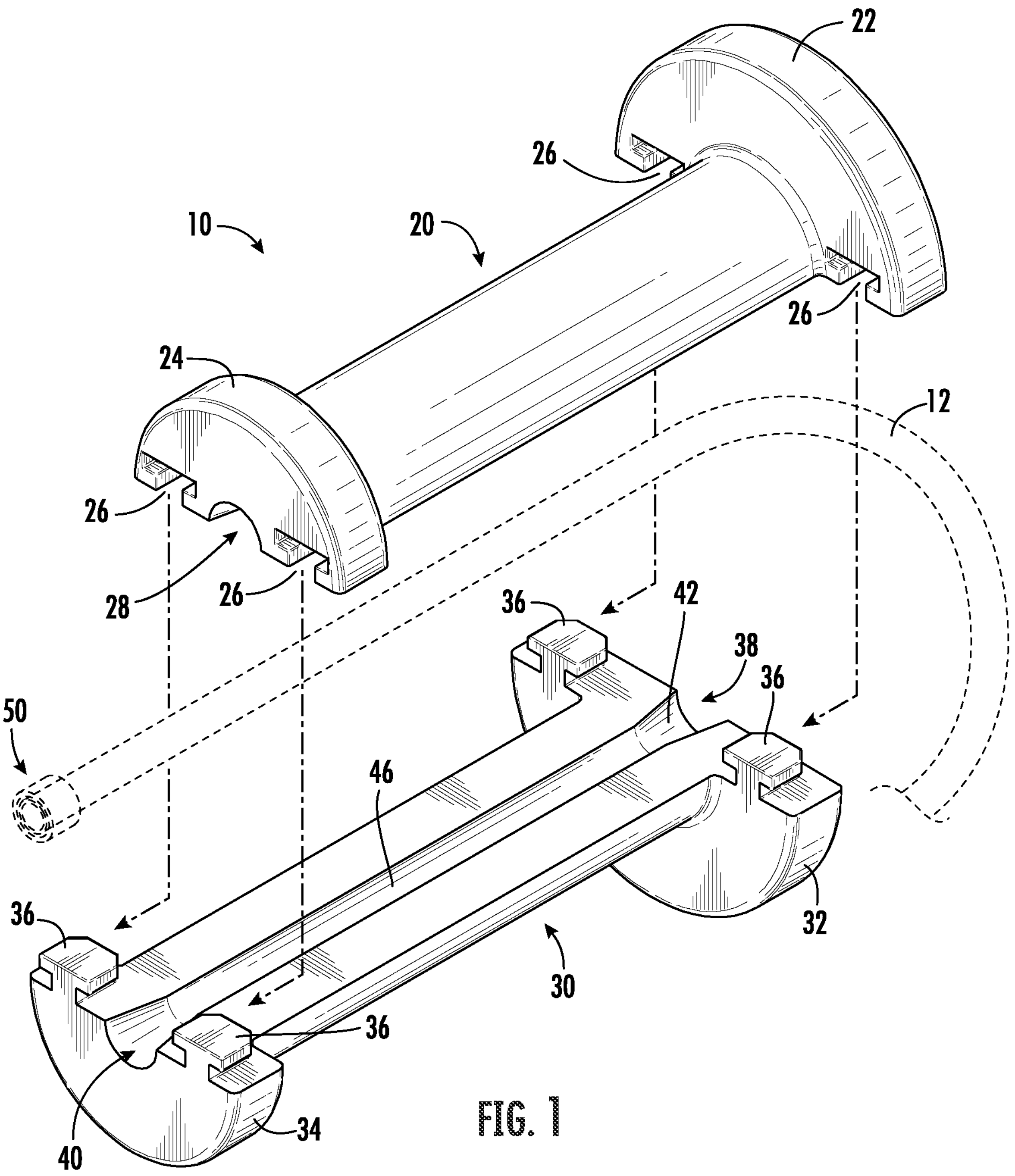
FIG. 1 is an exploded view of a line straightening hand tool in accordance with illustrative embodiments.

With reference to FIG. 1, the two halves or sections, 20 and 30, of the hand tool 10 are shown in an exploded view to reveal the internal channels 28 and 38. The sections 20 and 30 are similar in that the channel 28 and 38 are mirror images of each other. With reference to section 30, each section has a channel 46 with ends 40 and 42 that are chamfered from the outside into the channel 46.

The sections 20 and 30 differ as follows. Section 20 has a plurality of recesses 26 that are formed in the end flanges 22 and 24. Section 30 has projections 36 that are formed in the end flanges 32 and 34. The respective recesses 26 and projections 36 are aligned opposite to each other. The recesses 26 and projection are mated and the channels are aligned vertically to form a line straightening tunnel, see FIGS. 2, 5, and 6.

Figure 2:
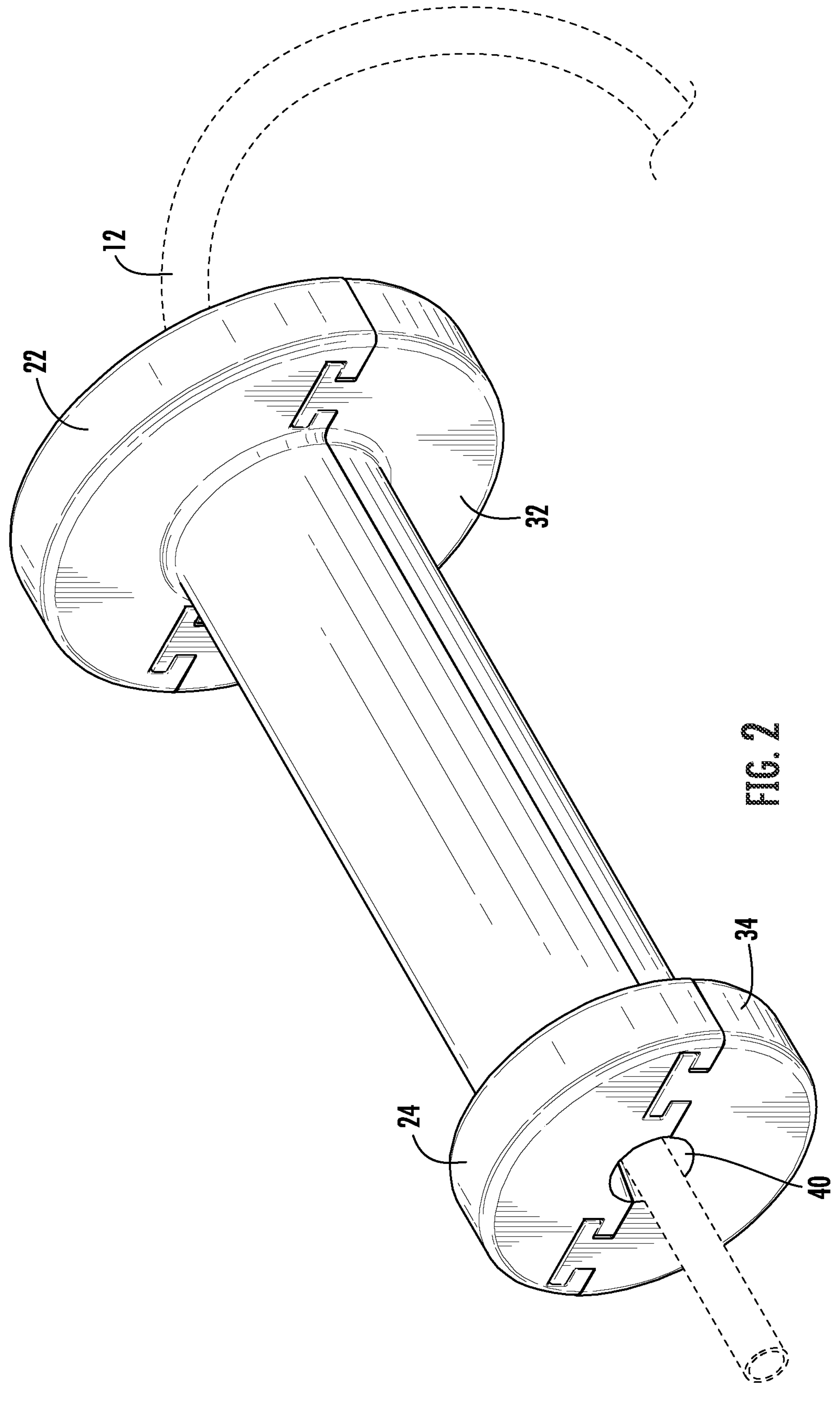
FIG. 2 is an assembled view of the line straightening hand tool in FIG. 1 and illustrates a preferred direction for working a line.

With reference to FIGS. 1 and 2, it can be seen that the mated half sections form a tunnel in a portion of the tool body 10 with an entrance and an exit for moving a line 12 through the tunnel.

In an embodiment, the ends 22 and 32 are designated as defining the entrance and ends 24 and 34 are designated as defining the exit. In this embodiment, the end flanges 24 and 34 have a diameter that is greater than the diameter of the longitudinal portion of section 20 and 30, and the end flanges 22 and 32 have a diameter that is greater than the diameter of the end flanged 24 and 34. This difference in diameter forms a stop that can abut the hand of a user and assist in move a line 12 through the tool.

Figure 3:
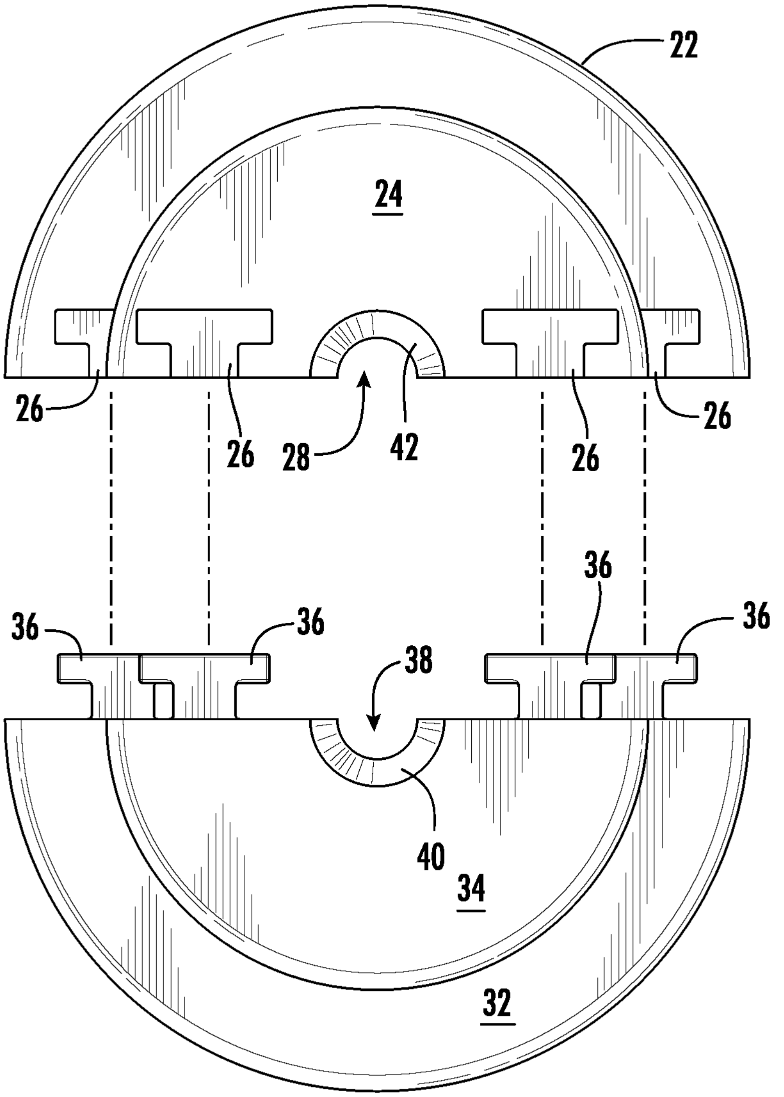
FIG. 3 is a view of the line straightening tool in FIG. 1 looking from the small end.
Figure 4:
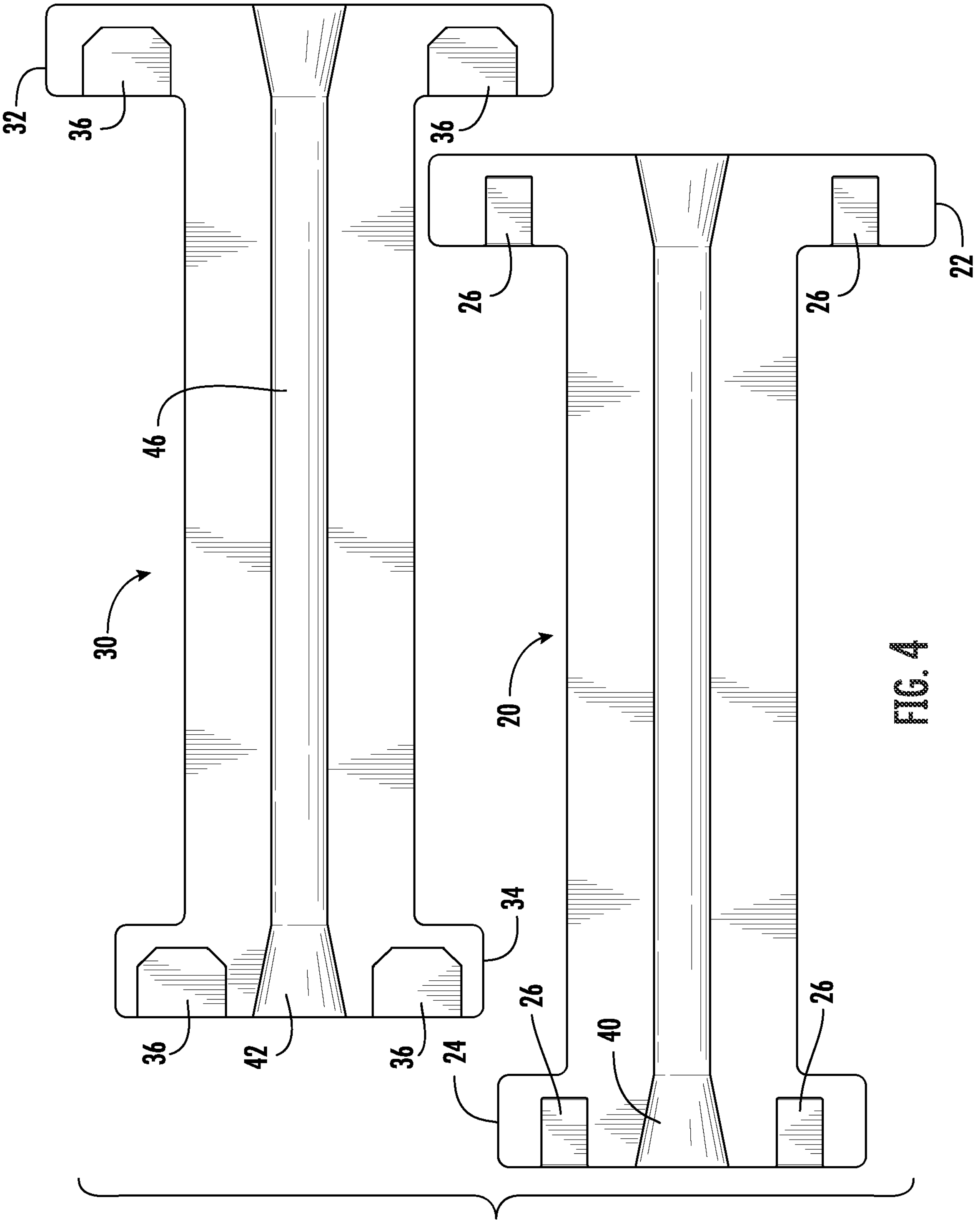
FIG. 4 is a side view showing the interlocking tabs and recesses on the mating sections that mate longitudinally.
Figure 5:
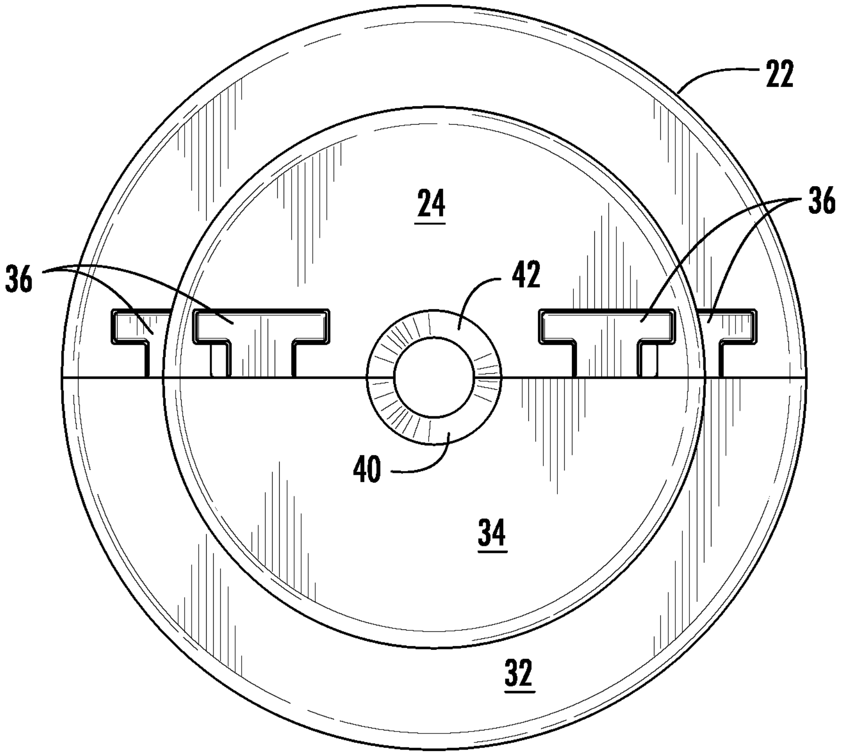
FIG. 5 is a plan view from the exit end of the line straightening hand tool in FIG. 1.
Figure 6:
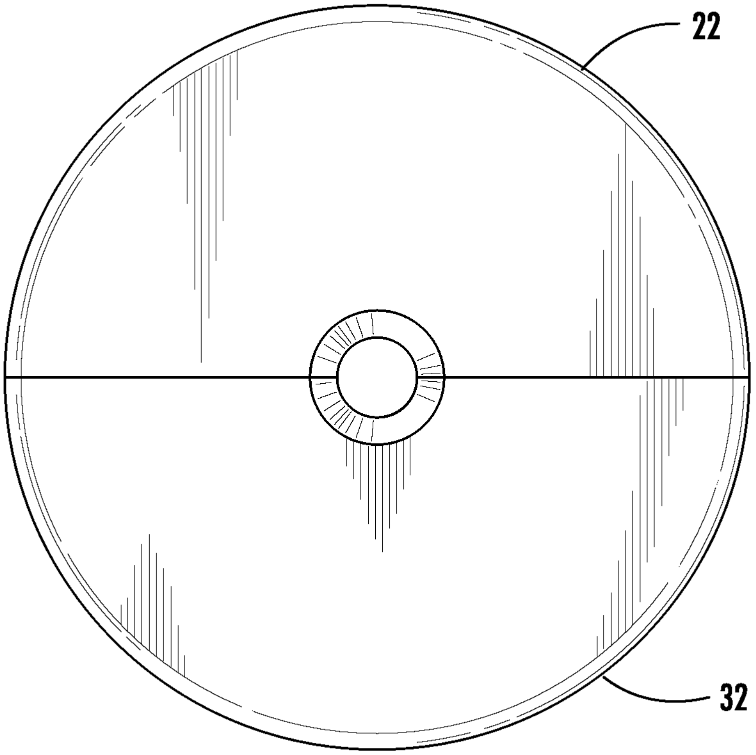
FIG. 6 is a plan view from the entry end of the line straightening hand tool in FIG. 1.
Figure 7:
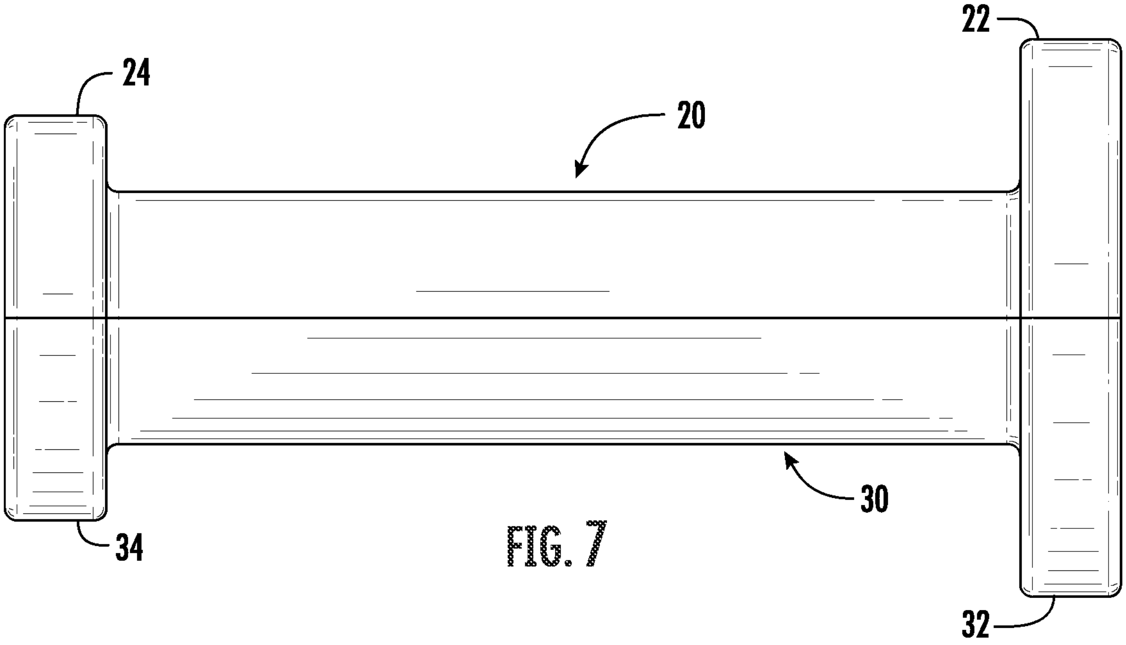
FIG. 7 is a side view of the line straightening tool in FIG. 1, the other side being a mirror image thereof.
Figure 8:
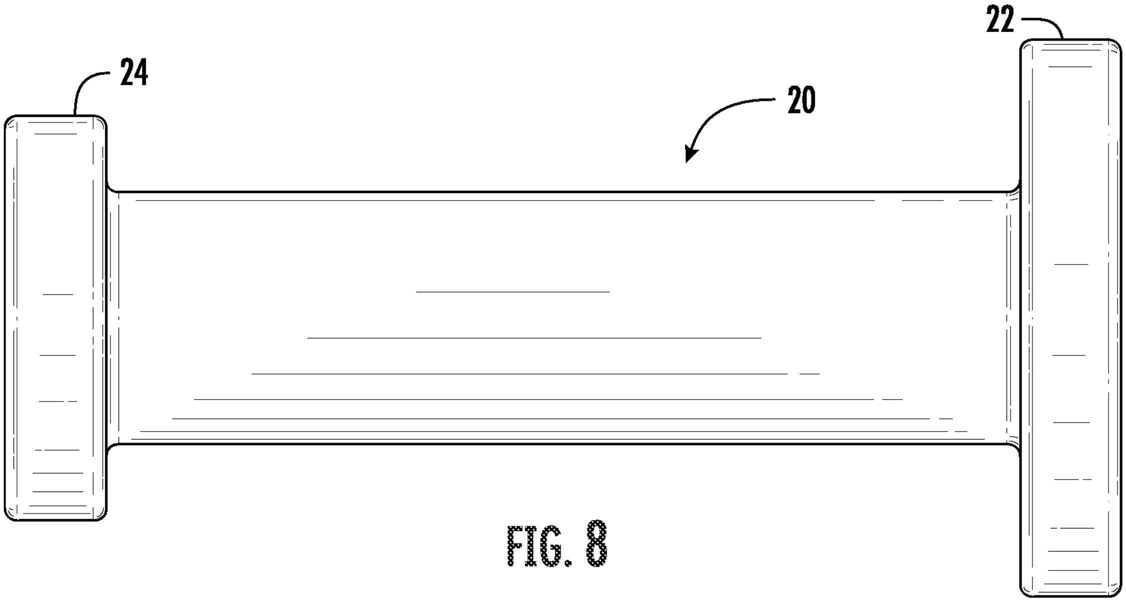
FIG. 8 is a top view of the line straightening hand tool in FIG. 1, the bottom view being a mirror image thereof; and, FIGS. 9 and 10 illustrate an alternative embodiment of the line straightening hand tool wherein the projects and recesses mate horizontally.

With reference to FIGS. 3, 4 and 5, the greater diameter of end flanges 22 and 32 provide an addition advantage. The greater flange size permits the recesses 26 and the projections 36 to be spaced further from a centerline in the longitudinal direction of the tunnel. This provides multiple pressure point when a line 12 is moved through the hand tool 10.

With reference to FIG. 4, it can be seen that the recesses 26 in section 20 are limited in their depth so that a stop point is established in the flange 22. Similarly, the projections 36 in section 30 have a limited length so they will abut the stop point and keep the section 20 and 30 aligned in the hand tool 10.

The hand tool 10 is useful for lines that have an attached connector of lines with no connectors. A bare line 12, see FIG. 2, can be fed directly into the tool 10. A line with a connector can be straightened by opening the sections 20 and 30 and inserting the line in the channel with the connector extending beyond the tool flange. Upon closing the sections, the line can be pulled back, if necessary to straighten a section of the line or the line can be moved forward through the tool until a desire length of line is straight.

Figure 9:
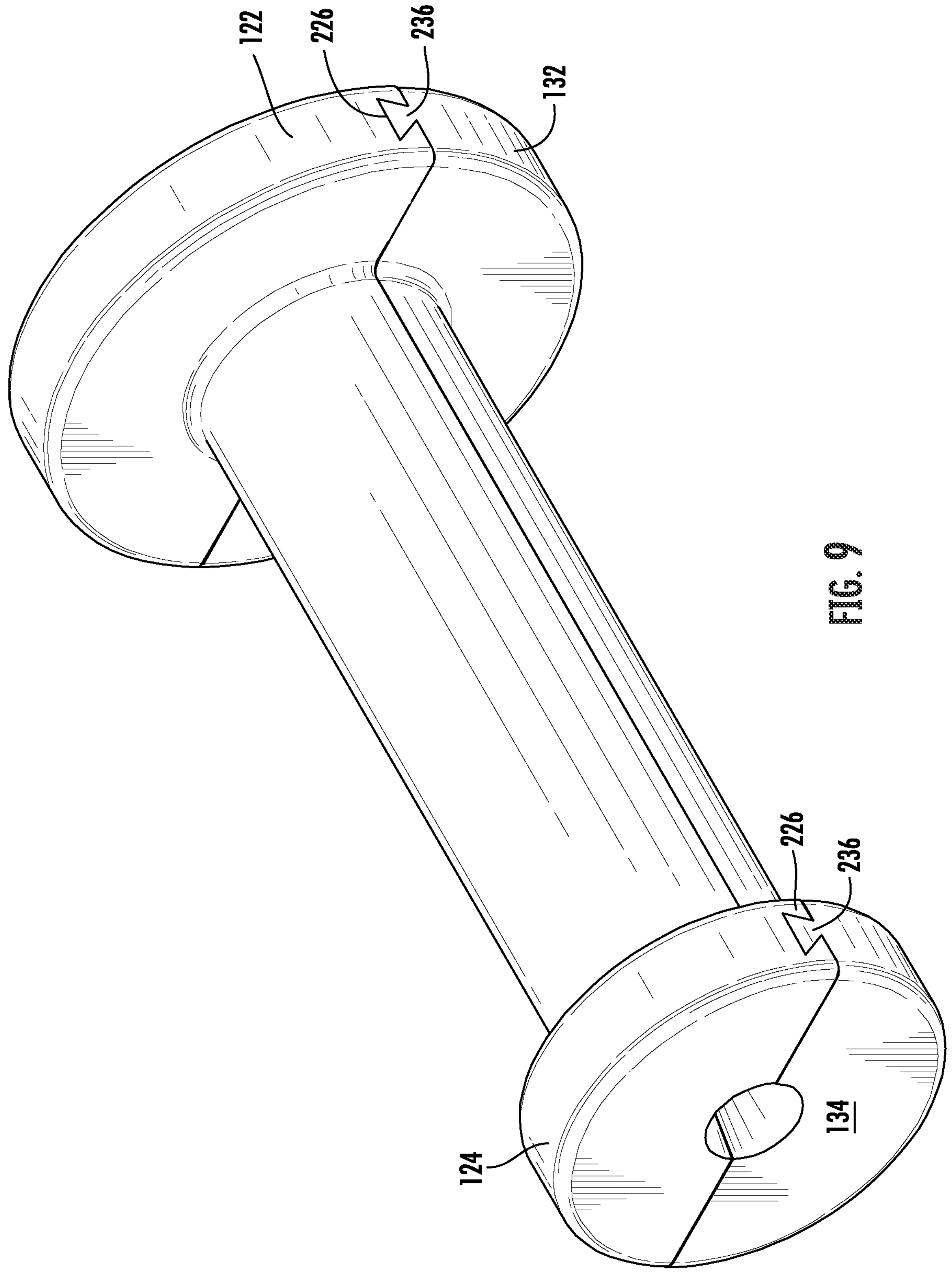
Figure 10:
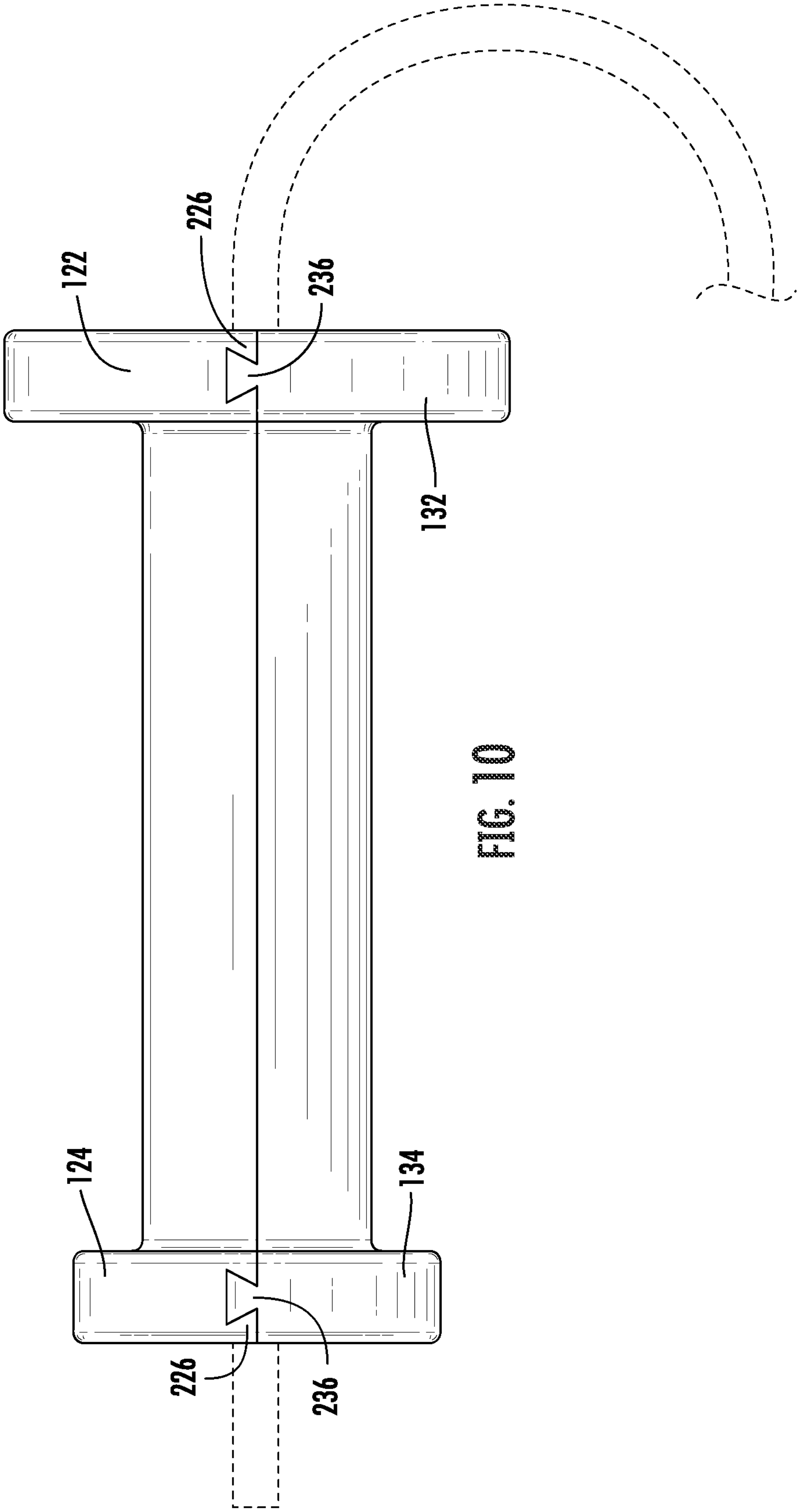

With reference to FIGS. 9 and 10, there is shown an alternative embodiment. In this embodiment, elements that are unnumbered have common functions with the previously described embodiment. In this embodiment, the end flanges 122, 124, 132, and 134 differ in that that have recesses 226 and projections 236 that are aligned to mate horizontally with respect to a centerline through the longitudinal tunnel 160. Like the prior embodiment, this embodiment is useful for bare line and line having a preassembled connector.

The tool sections 20 and 30 may be molded or casted in plastic or metal depending on a specific line application. Likewise, the channels 46 can be dimensioned for a specific line diameter, and, depending upon a specific line material or the need to preserve an exterior surface of the line, bushing may be inserted in the chamfers at one or both ends of the tool.

What is claimed is:

1. A hand tool for straightening a fluid line, the hand tool comprising;

an elongated body having two sections that are configured to interlock and define a line straightening tunnel between ends of the elongated body;

one of the two sections has recesses on either side of an elongated channel; one of the two section has projections on either side of an elongated channel that are configured to mate with the recesses in the other of the two sections;

wherein the two sections are moved with respect to each other to interlock the projections and recesses and position the elongated channels opposite to each other and form the line straightening tunnel in the elongated body; and wherein the elongated body has a portion with a first diameter and each of the ends has a flange with a diameter that is greater that the first diameter of the elongated body.

2. The hand tool of claim 1, wherein one end has a flange with a diameter that is greater than the diameter of the flange at the other end.

3. The hand tool of claim 2, wherein the flange with the greater diameter forms an abutment for a hand holding the tool.

4. The hand tool of claim 1, wherein the two sections of the elongated body are moved longitudinally with respect to each other to interlock the projections and recesses.

5. The hand tool of claim 1, wherein the ends of the elongated body have a chamfer end connected to the line straightening tunnel.

6. The hand tool of claim 1, wherein the two sections of the elongated body are moved horizontally with respect to each other to interlock the projections and recesses.

7. A hand tool for straightening a fluid line, the hand tool comprising;

an elongated body having a plurality of sections;

a first one of the plurality of sections has ends with recesses on either side of an elongated channel dimensioned for a fluid line;

a second one of the plurality of sections has ends with projections on either side of an elongated channel dimensioned for a fluid line that are configured to mate and interlock with the recesses in the first section;

wherein the first and second sections interlock and define a line straightening tunnel that receives a fluid line between ends of the elongated body; and wherein the elongated body has a portion with a first diameter between the ends, and each of the ends has a flange with a diameter that is greater that the first diameter of the elongated body.

8. The hand tool of claim 7, wherein one end has a flange with a diameter that is greater than the diameter of the flange at the other end.

9. The hand tool of claim 8, wherein the end having a flange with a diameter that is greater than the diameter of the flange at the other end includes a chamfer that guides a line into the line straightening tunnel.

10. The hand tool of claim 7, wherein at least the end with the flange with a diameter that is greater than the diameter of the flange at the other end includes a bushing.

11. The hand tool of claim 7, wherein the flange with the greater diameter forms an abutment for a hand holding the tool.

12. The hand tool of claim 7, wherein the plurality of sections are plastic.

13. The hand tool of claim 7, wherein the plurality of sections are metallic.

14. The hand tool of claim 7, wherein the first and second sections interlock longitudinally.

15. The hand tool of claim 7, wherein the first and second sections interlock horizontally.

* * * * *